United States Patent [19]

Kawashima

[11] Patent Number: 5,031,208
[45] Date of Patent: Jul. 9, 1991

[54] DATA COMMUNICATION SYSTEM AND APPARATUS FOR TRANSMITTING DATA ON A LINE AND INTERRUPTING DATA TRANSMISSION WHEN AN ACCOUNTING PULSE IS DETECTED ON THE LINE

[75] Inventor: Toshihiko Kawashima, Tokyo, Japan
[73] Assignee: Canon Kabushiki Kaisha, Tokyo, Japan
[21] Appl. No.: 281,382
[22] Filed: Dec. 8, 1988
[30] Foreign Application Priority Data Dec. 18, 1987 [JP] Japan ............................ 62-319014

[51] Int. Cl.$^5$ .............................................. H04L 1/00
[52] U.S. Cl. ........................................ 379/100; 379/124
[58] Field of Search ................... 379/93, , 96, 97, 98, 379/100, 123, 124, 126, 130, 131; 371/4

[56] References Cited

U.S. PATENT DOCUMENTS 4,008,377  2/1977  Szczepanski et al. ............... 379/124
4,823,376  4/1989  Takahashi ........................... 379/100

FOREIGN PATENT DOCUMENTS

0037307  4/1978  Japan ................................. 379/124
0141513  12/1978  Japan ................................. 379/124
0093475  7/1981  Japan ................................. 379/124

Primary Examiner—Jin F. Ng
Assistant Examiner—Stella L. Woo
Attorney, Agent, or Firm—Fitzpatrick, Cella, Harper & Scinto

[57] ABSTRACT

A data communication system and apparatus performs data communication by using a public telephone line network. This apparatus includes: a data transmitter to transmit data to a communication partner equipment through a line; a detector to detect accounting pulses obtained from the line; a controller to control the data transmitter so as to interrupt the data transmission when the accounting pulse is detected by the detector; and an image reader to read an image. The data transmitter transmits the read image data which is read by the reader or the data which is input by a key input device. The detector detects the inversion of the polarity of the line, thereby detecting the arrival of the accounting pulse. According to the data communication apparatus, data transmission of a high reliability can be performed at a high speed while minimizing the generation of errors without being influenced by the noise electric power generated during the inverting operation of the polarity of the pulse on the line.

20 Claims, 6 Drawing Sheets

DATA COMMUNICATION SYSTEM AND APPARATUS FOR TRANSMITTING DATA ON A LINE AND INTERRUPTING DATA TRANSMISSION WHEN AN ACCOUNTING PULSE IS DETECTED ON THE LINE

BACKGROUND OF THE INVENTION

1. Field of the Invention

The present invention relates to data communication system and apparatus for performing data communication by using a public telephone line network.

2. Related Background Art

Hitherto, there has been known a public telephone line network for transmitting accounting pulses from the network side to a terminal during the use of the line in order to properly inform a user of line charges or to collect the line charges from a user. The public telephone line is generally used for voice communication.

In recent years, even in data terminal equipment such as facsimile apparatus to communicate image data, or handy-type terminal to communicate code data, etc., data communication is executed with partner terminal equipment by connecting to the public telephone line.

To perform the data communication by using the public telephone network, it is necessary to call a communication partner to form a communication path and, thereafter, to perform the data communication with the communication partner called. The communication path (speech path) is formed by switching equipment of the line network. The line charges are added (metering system) in accordance with the distance of the communication path and use time.

Figure 5:
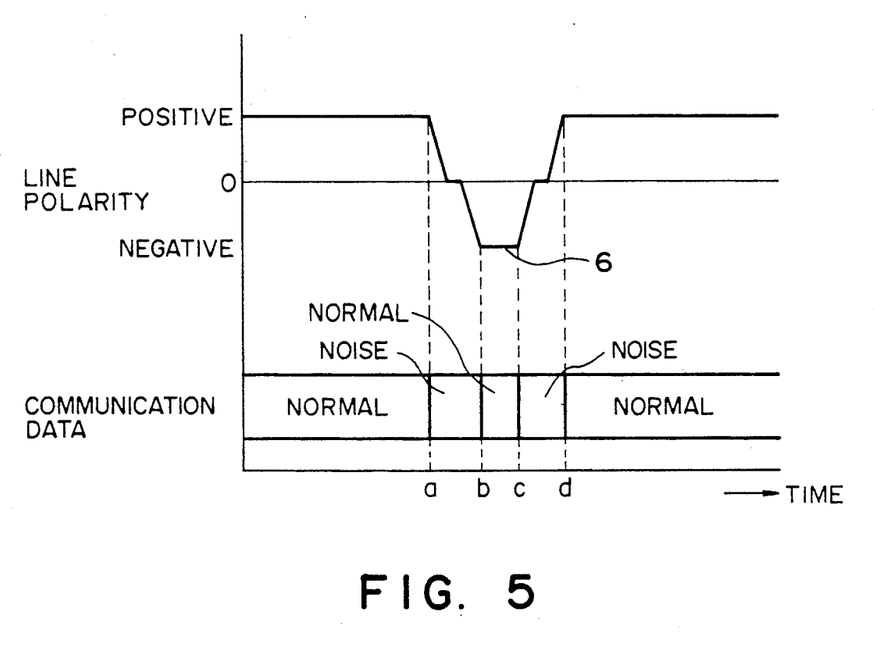
FIG. 5 is a data transmission timing chart when an accounting pulse arrives in a conventional technique.

In the case of using an electromagnetic exchange or the like, an electromagnetic counter which operates by DC pulses is used as a call meter for counting the charges. An accounting pulse is output every metering and the call meter is counted. Therefore, as shown in FIG. 5, the accounting pulse is produced by inverting the DC voltage polarity of the line.

However, since the accounting pulses are transmitted from the network to a terminal through the communication line during the communication, a noise electric power is generated during the operations of inverting the polarity. In the case of the speech communication, such a noise electric power is not relatively conscious. However, in the case of the data communication, the noise electric power also becomes a cause of the generation of transmission errors. That is, the noise electric power is generated in the intervals between a and b and between c and d in FIG. 5, so that the data transmission quality deteriorates. Particularly, when data communication over a long distance is performed, the accounting pulses are frequently generated, causing a large obstacle to improve the error rate.

On the other hand, there is a drawback such that since data is retransmitted for every generation of an error, the communication time becomes long.

SUMMARY OF THE INVENTION

It is an object of the present invention to provide data communication system and apparatus which can eliminate the foregoing drawbacks of conventional techniques.

Another object of the invention is to provide a data communication system and apparatus which can minimize the generation of errors and can perform the data transmission with a high reliability.

To accomplish the above object, according to a preferred embodiment of the invention, there are provided detecting means for detecting the arrival of an accounting pulse from a line and interrupting means for interrupting data communication when the detecting means detects the arrival of the accounting pulse.

Still another object of the invention is to provide data communication system and apparatus which can certainly perform data transmission at a high speed.

Still another object of the invention is to provide data communication system and apparatus which can eliminate the influence by a noise electric power which is generated during the inverting operation of the polarity of a pulse on a line.

The above and other objects and features of the present invention will become apparent from the following detailed description and the appended claims with reference to the accompanying drawings.

DETAILED DESCRIPTION OF THE PREFERRED EMBODIMENTS

An embodiment of the present invention will be described in detail hereinbelow with reference to the drawings.

Figure 1:
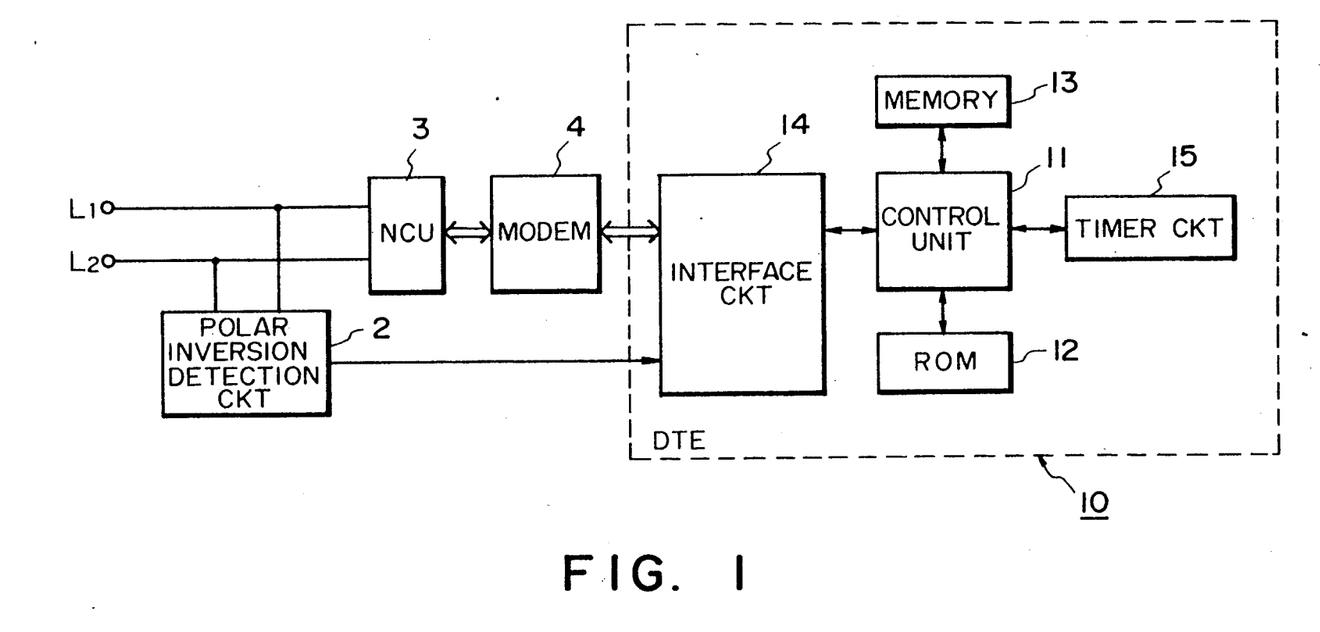
FIG. 1 is a block diagram of an embodiment according to the present invention.

FIG. 1 is a block diagram of an embodiment according to the invention. In the diagram, $L_1$ and $L_2$ denote analog telephone lines (main wires) of the two-line type which are connected to a public telephone line network. Reference numeral 2 denotes a polar inversion detection circuit to detect that the DC voltage polarities of the main wires $L_1$ and $L_2$ are inverted when a communication partner responds or an accounting pulse arrives; reference numeral 3 indicates a network control unit (NCU) to perform the interface with the public line network; and reference numeral 4 is a modem to modulate and demodulate transmission/reception data.

Reference numeral 10 denotes data terminal equipment (DTE) to perform the data communication with other equipment through the public line network. In the DTE 10, reference numeral 11 denotes a control unit to perform the entire control of the DTE 10 in accordance with a program stored in a ROM 12 and shown in, e.g., FIG. 2; reference numeral 12 indicates the ROM to store various kinds of parameters and the like in addition to the program shown in FIG. 2; reference numeral 13 a memory to store transmission/reception data and the like; reference numeral 14 an interface circuit to perform the interface between the control unit 11 and a terminal equipment such as polar inversion circuit 2, modem 4, or the like; and reference numeral 15 a timer circuit to count a predetermined time.

Figure 6:
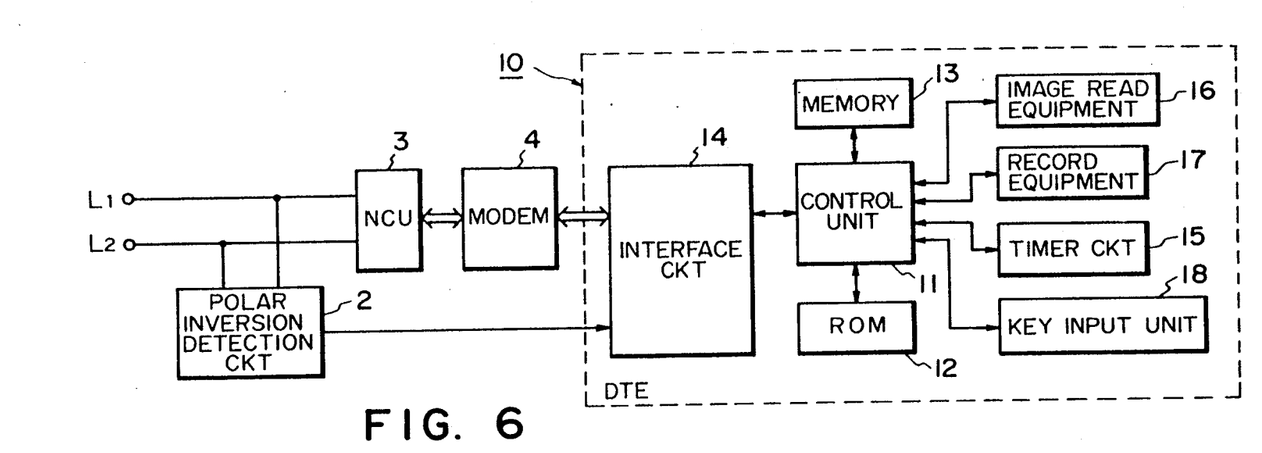
FIGS. 6 and 7 are block diagrams showing modifications of the embodiment of FIG. 1.

Although the detailed description is omitted because it is not directly concerned with the invention, when the DTE 10 is a facsimile apparatus, as shown in FIG. 6, an image read equipment 16 to read an original image, a record equipment 17 to record the image on the basis of the reception data, and a key input unit 18 to input a destination or the like are connected to the control unit 11. In this case, the data read by the image read equipment 16 or the data which is received through the main wire is recorded by the record equipment 17 and is stored into the memory 13.

Figure 7:
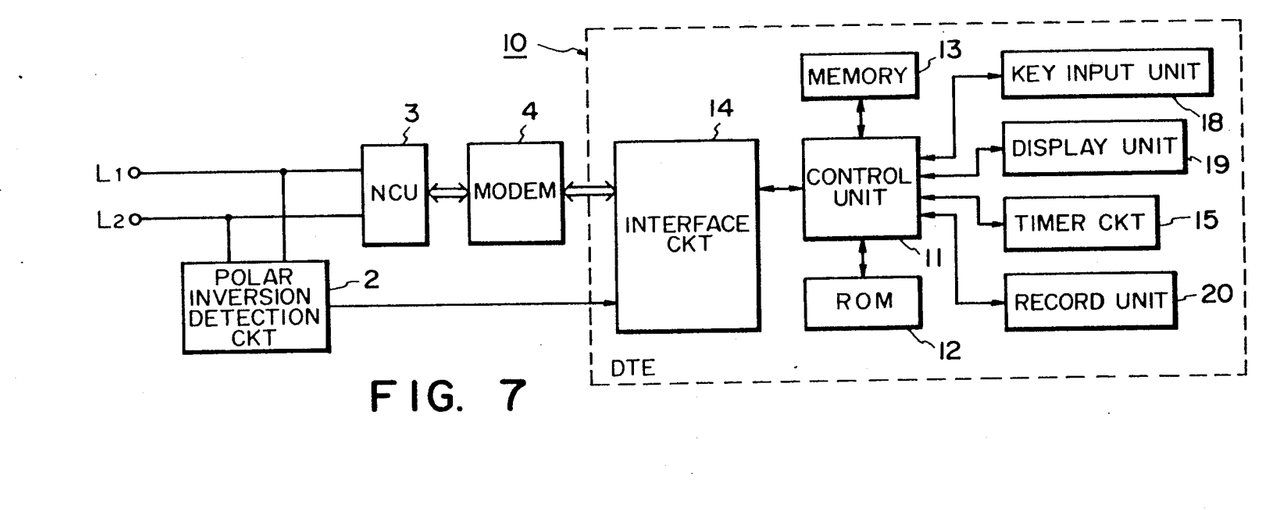

On the other hand, when the DTE 10 is a handy-type terminal which can input and store various data such as article name, amount, and quantity which are used in the management of goods or the like and can display, record, and transmit the result, as shown in FIG. 7, the key input unit 18, a display unit 19, and a record unit 20 are connected to the control unit 11. Since the handy-type terminal has been disclosed in detail in U.S. patent application Ser. No. 444,220, its detailed description is omitted. The handy-type terminal receives the code data such as article name, amount, quantity, etc. from the key input unit 18 and calculates the sums, for instance, every store, every goods, or the like by the control unit 11 and, thereafter, can store the calculated sums into the memory 13 or print this sum by the record equipment 17. On the other hand, the handy-type terminal can transmit the data stored in the memory 13 through the main wire and can input it to a calculator to sum.

Figures 2, 2B:
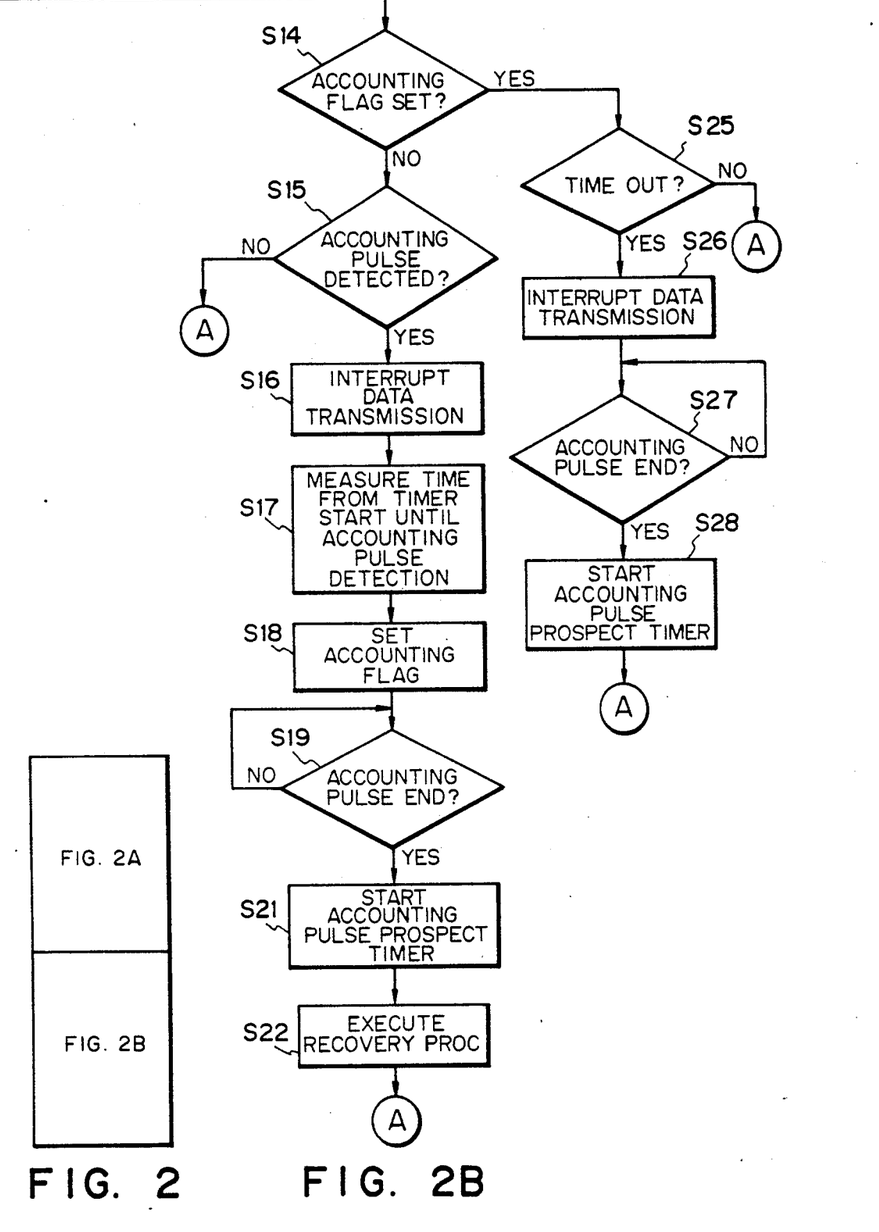
FIG. 2 is a diagram showing the layout of FIGS. 2A and 2B.
FIGS. 2A and 2B are control flowcharts for the embodiment.
Figure 2A:
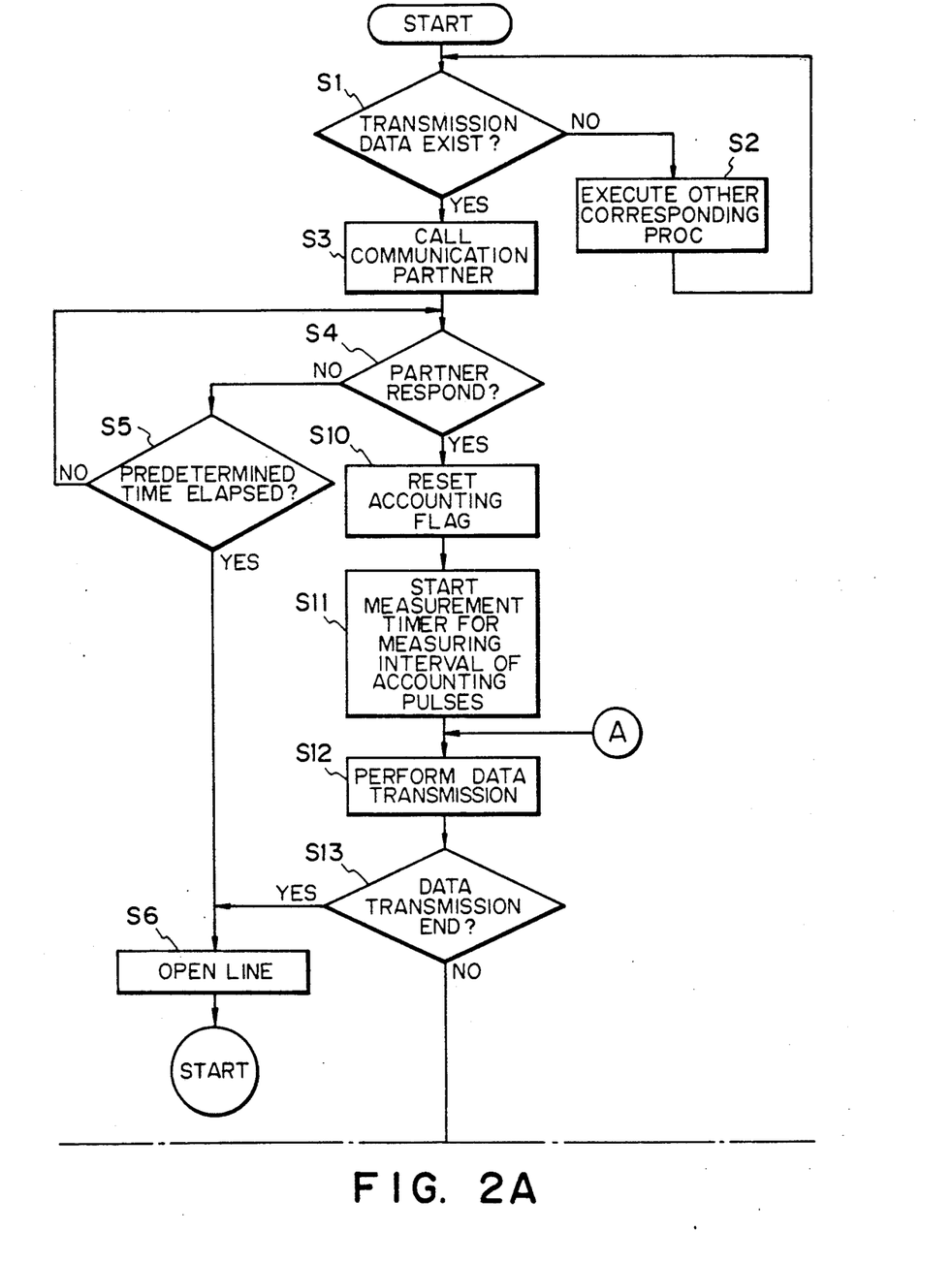

The transmission control of the control unit 11 in the embodiment having the foregoing construction will be described hereinbelow with reference to a flowchart of FIGS. 2A and 2B.

First, in step S1, a check is made to see if data to be transmitted exists or not. If no transmission data exists, step S2 follows and the other corresponding processes are executed. For instance, when calls are transmitted from the main wires $L_1$ and $L_2$, the well-known process such as a corresponding receiving process or the like is executed in response to them.

If the transmission data exists, step S3 follows and a DC loop is formed for the main wires $L_1$ and $L_2$. Subsequently, an instruction is given to an ACU (automatic calling unit) of the NCU 3, a telephone number signal of a desired communication partner is output, and the calling process is executed. In the next steps S4 and S5, checks are made to see if the communication partner has responded within a predetermined time or not and to see if the polar inversion detection circuit 2 has detected the inversion of the polarities of the main wires $L_1$ and $L_2$ or not. If the partner does not respond within the predetermined time, this means that the receiving preparation of the partner equipment is not yet completed. Therefore, step S6 follows step S5 and the DC loop produced for the main wires $L_1$ and $L_2$ is opened to recover the main wires $L_1$ and $L_2$. Then, the processing routine is returned to step S1.

On the contrary, when the partner has responded within the predetermined time, step S10 follows after step S4 and an accounting flag in the memory 13 is reset. In the next step S11, a measurement timer to measure the interval of the accounting pulses which arrive is started. In step S12, data of a predetermined unit is transmitted. In step S13, a check is made to see if all of the data transmission of the predetermined unit has been finished or not. If YES, step S6 follows and the main wires are recovered. On the contrary, if the data transmission is not finished yet, step S14 follows and a check is made to see if the accounting flag has been set or not. Since the accounting flag has first been reset, the processing routine advances to step S15 and a check is made to see if the inversion of the polarities has been detected by the polar inversion detection circuit 2 or not, that is, to see if the accounting pulse has been detected or not. If no accounting pulse is detected, the processing routine is returned to step S12 and the data is transmitted. If the accounting pulse has been detected, step S16 follows. In the detecting process of the accounting pulse, the control unit 11 performs only the data transmission. When the accounting flag is reset, the interruption is executed by the polar inversion detection circuit 2 when the accounting pulse is detected. On the other hand, when the accounting flag is set, which will be explained hereinlater, the interruption is performed by the timer circuit 15 at the time-out. The processing routine advances to step S16 or S26, respectively.

In step S16, the data transmission which is at present being executed is interrupted. In step S17, the elapsed time from the start of the timer in the timer circuit 15 to measure the interval of the accounting pulses until the detection of the arrival of the accounting pulse is measured, thereby measuring the arrival time interval of the accounting pulses. In the measurement, the time interval is not limited to the time until the arrival of the first accounting pulse but the time interval until the arrival of the second or a predetermined larger number of accounting pulses can be measured to thereby improve the accuracy of the time interval. The measured time interval is held in the memory 13. The accounting flag is set in step S18. In step S19, a check is made to see if the end of the accounting pulse has been detected or not. That is, since the main wires $L_1$ and $L_2$ whose polarities were once inverted are returned to the original polarities, the end of the accounting pulse corresponds to the time point when the polarities are again inverted. Therefore, a check is made to see if the polarities are again inverted or not. When the end of the accounting pulse is detected, step S21 follows and the accounting pulse time interval which has previously been measured and stored in the memory 13 is set into the timer circuit 15 and a control is made so as to time out when the set time has elapsed. Then, step S22 follows. In step S22, the recovery process for the data (data which were output for a period of time until the interruption of the data transmission after the arrival of the accounting pulse) which were transmitted during the polarity inverting operation at the time of the preceding arrival of the accounting pulse is executed. Then, the processing routine is returned to step S12.

Figure 3:
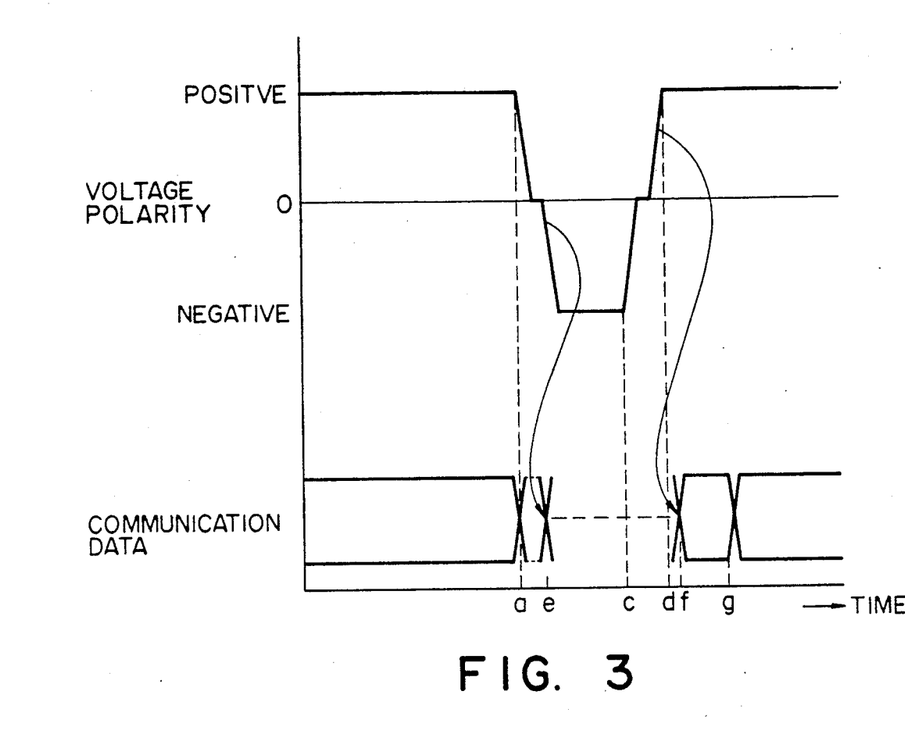
FIGS. 3 and 4 are data transmission timing charts when an accounting pulse arrives in the embodiment.

FIG. 3 shows a data transmission timing at the arrival of the accounting pulse during that period of time. In FIG. 3, a time interval between a and e corresponds to an output timing of the data transmitted during the polarity inverting operation and indicates the data in which transmission errors occurred. A time interval between f and g corresponds to an error recovery processing timing of the data transmitted for the time interval between a and e in which the transmission errors were generated. In this case, as compared with the case of FIG. 5 or the like, the influence of the noise electric power at the arrival of the accounting pulse is very small, the recovery processing time is very short, and its possibility is also small.

On the other hand, when the accounting flag has been set in step S14, step S25 follows and a check is made to see if the time out from the timer circuit 15 has occurred and the prospect time of the arrival of the accounting pulse has come or not. If NO, the processing routine is returned to step S12 and the data transmission is continued. If YES, step S26 follows and the data transmission is interrupted. In the next step S27, a check is made to see if the end of the accounting pulse after the arrival of the accounting pulse has been detected or not in a manner similar to step S19. When the end of the accounting pulse is detected, the processing routine advances from step S27 to step S28. The accounting pulse time interval is read out of the memory 13 and set into the timer circuit 15 in a manner similar to step S21. Then, the processing routine is returned to step S12.

Figure 4:
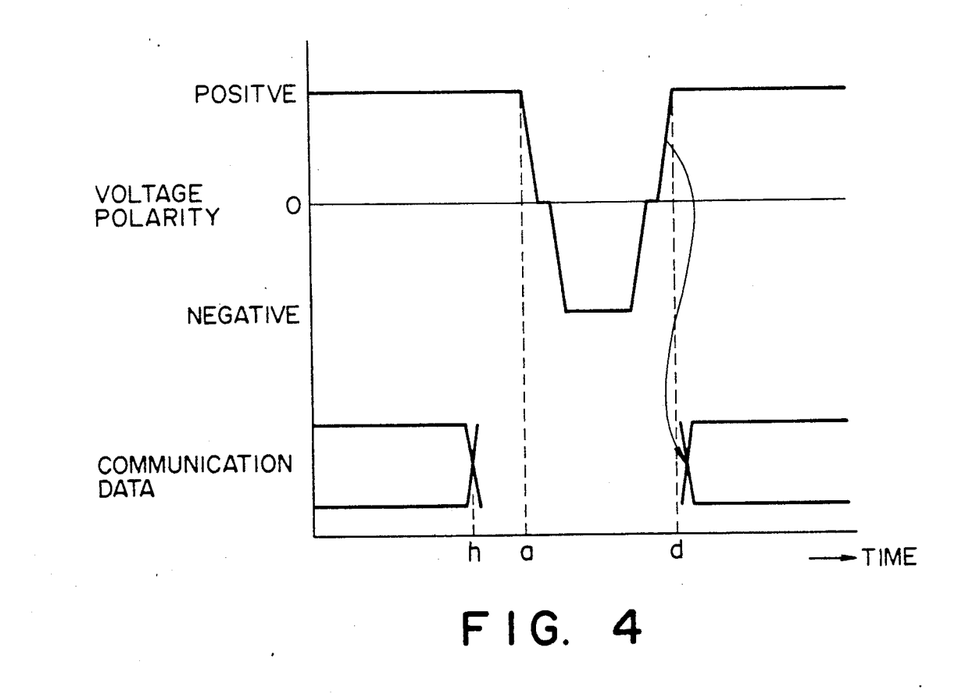

FIG. 4 shows a data transmission timing at the arrival of the accounting pulse in the foregoing processes.

In FIG. 4, since the data transmission is preliminarily interrupted from time h at which the arrival of the accounting pulse is prospected, the generation of the data transmission errors as in the time interval between a to e in FIG. 3 mentioned above does not occur. The error rate is minimized and it is possible to perform the control which does not require a troublesome error recovery process.

As described above, according to the embodiment, the arrival of the accounting pulse from the switching equipment is always monitored during the data transmission. When the accounting pulse has arrived or when the arrival of the accounting pulse is prospected, the data communication is interrupted. After the end of the accounting pulse was confirmed, the data communication is restarted. Therefore, the influence of the noise electric power which is generated during the inverting operation of the polarity of the pulse can be eliminated. The data transmission of a high reliability in which the generation of errors is minimized can be performed at a high speed.

In the embodiment, the time of the arrival of the accounting pulse has been prospected by measuring the arrival time interval of the accounting pulses. However, the time interval of the arrival of the accounting pulses can be also previously stored into the memory 13 in correspondence to the telephone number of a communication partner. In such a case, when the telephone number of the partner equipment is set, the arrival time interval of the accounting pulses is read out of the memory 13. The timer is started when a call is set. When the time interval read out of the memory has come, the data transmission is interrupted.

If the transmission data has a continuity such as in the case of an image signal, even if there exists a short time (time when the data of one line cannot be transmitted) from the completion of the data transmission of one line until the timing of the arrival of the accounting pulse, the data transmission of the next line is interrupted.

Thus, it is prevented that data is divided to different lines and transmitted. A continuity can be provided to the data.

Although the embodiments have been described with respect to the case where a facsimile apparatus or a handy-type terminal is used as the DTE 10, the invention can be also applied to other data terminal equipment such as teletex or the like.

Although the present invention has been described with respect to preferred embodiments, the invention is not limited to the foregoing embodiments but many modifications and variations are possible within the spirit and scope of the appended claims of the invention.

I claim:
1. A data communication apparatus comprising:
   data transmitting means for transmitting data to a partner equipment through a line;
   detecting means for detecting an accounting pulse which is obtained from the line during data transmission to the line;
   control means for controlling said data transmitting means so as to interrupt the data transmission when the accounting pulse is detected by said detecting means; and
   reading means for reading an image, and wherein said data transmitting means transmits the data read by said reading means.

2. An apparatus according to claim 1, wherein said detecting means detects that a polarity of the line was inverted, thereby detecting the arrival of the accounting pulse.

3. An apparatus according to claim 1, wherein the line is a public telephone line.

4. A data communication apparatus comprising:
   data transmitting means for transmitting data to a partner equipment through a line;
   detecting means for detecting an accounting pulse which is obtained from the line during data transmission to the line;
   control means for controlling said data transmitting means so as to interrupt the data transmission when the accounting pulse is detected by said detecting means; and
   key input means for inputting code data, and wherein said data transmitting means transmits the data input by said key input means.

5. An apparatus according to claim 4, wherein said detecting means detects that a polarity of the line was inverted, thereby detecting the arrival of the accounting pulse.

6. An apparatus according to claim 4, wherein the line is a public telephone line.

7. A data communication apparatus comprising:
   data transmitting means for transmitting data to a partner equipment through a line;
   detecting means for detecting an accounting pulse which is obtained from the line during data transmission to the line;
   control means for controlling said data transmitting means so as to interrupt the data transmission when the accounting pulse is detected by said detecting means; and
   timer means for measuring a time interval of the arrival of the accounting pulses and memory means for storing the time interval obtained by said timer means.

8. An apparatus according to claim 7, wherein said control means determines a timing for the arrival of the accounting pulse on the basis of the time interval stored in said memory means and controls said data transmitting means so as to interrupt the data transmission.

9. An apparatus according to claim 7, wherein said timer means measures a time interval from the connection between the partner equipment and the line until the arrival of a first accounting pulse.

10. A data communication apparatus comprising:
    data transmitting means for transmitting data to a partner equipment through a line;
    detecting means for detecting an accounting pulse which is obtained from the line during data transmission to the line; and control means for controlling said data transmitting means so as to interrupt the data transmission when the accounting pulse is detected by said detecting means;

wherein said control means controls said data transmitting means so as to retransmit the data transmitted during the arrival of the accounting pulses.

11. A data communication apparatus comprising:

data transmitting means for transmitting data to a partner equipment through a line;

means for determining when an accounting pulse will arrive from the line to be used for data transmission to the partner equipment; and control means for controlling said data transmitting means so as to interrupt the data transmission at the timing of the arrival of the accounting pulse.

12. An apparatus according to claim 11, further comprising reading means for reading an image, and wherein said data transmitting means transmits the data read by said reading means.

13. An apparatus according to claim 11, further comprising key input means for inputting code data, and wherein said data transmitting means transmits the data input by said key input means.

14. An apparatus according to claim 11, wherein said determining means comprises timer means for measuring a time interval of the arrival of the accounting pulses and memory means for storing the time interval obtained by said timer means and determines the arrival time of the accounting pulse on the basis of the time interval stored in said memory means.

15. An apparatus according to claim 14, wherein said timer means measures a time interval from the connection between the partner equipment and the line until the arrival of a first accounting pulse.

16. An apparatus according to claim 11, wherein said control means controls said data transmitting means so as to interrupt the data transmission until the detection of the end of the accounting pulse.

17. A data communication method comprising the steps of:

performing a data communication with other equipment by using a line network;

detecting accounting pulses transmitted from an exchange of the line network during the data communication in said data communicating step;

interrupting the data communication in the data communicating step when the accounting pulse is detected in said detecting step; and reading an image, and wherein in said data communicating step, the data read in said reading step is transmitted.

18. A method according to claim 17, wherein said detecting step further comprises the step of detected that a polarity of a line was inverted, thereby detecting the arrival of the accounting pulse.

19. A data communication method comprising the steps of:

performing a data communication with other equipment by using a line network;

detecting accounting pulses transmitted from an exchange of the line network during the data communication in said data communicating step;

interrupting the data communication in the data communicating step when the accounting pulse is detected in said detecting step; and measuring a time interval for the arrival of the accounting pulse and storing the time interval obtained in said timing step.

20. A method according to claim 19, wherein said interrupting step comprises the step of determining the arrival time of the accounting pulse on the basis of the time interval stored in said storing step and wherein said communication step comprises the step of interrupting said data communicating step at said determined arrival time.

* * * * *

UNITED STATES PATENT AND TRADEMARK OFFICE
CERTIFICATE OF CORRECTION

PATENT NO. : 5,031,208
DATED : July 9, 1991
INVENTOR(S) : TOSHIHIKO KAWASHIMA

It is certified that error appears in the above-identified patent and that said Letters Patent is hereby corrected as shown below:

In the drawing:

SHEET 4 OF 6

FIG. 3, "POSITVE" should read --POSITIVE--.
FIG. 4, "POSITVE" should read --POSITIVE--.

COLUMN 1

Line 45, "operations" should read --operation--.

COLUMN 2

Line 14, "by" should read --of--.

COLUMN 8

Line 17, "detected" should read --detecting--.

Signed and Sealed this

Twenty-ninth Day of December, 1992

Attest:

DOUGLAS B. COMER

Attesting Officer

Acting Commissioner of Patents and Trademarks